United States Patent
Brenner

(10) Patent No.: US 7,065,766 B2
(45) Date of Patent: Jun. 20, 2006

(54) APPARATUS AND METHOD FOR LOAD BALANCING OF FIXED PRIORITY THREADS IN A MULTIPLE RUN QUEUE ENVIRONMENT

(75) Inventor: Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/195,175

(22) Filed: Jul. 11, 2002

(65) Prior Publication Data

US 2004/0010667 A1  Jan. 15, 2004

(51) Int. Cl.
*G06F 9/46* (2006.01)

(52) U.S. Cl. ...................... 718/103; 718/105
(58) Field of Classification Search ............... 718/103, 718/105
See application file for complete search history.

(56) References Cited

U.S. PATENT DOCUMENTS 5,826,081 A * 10/1998 Zolnowsky ................. 718/103

OTHER PUBLICATIONS

U.S. Appl. No. 09/506,230, filed Feb. 17, 2000, Brenner et al., Apparatus and Method for Dispatching Fixed Priority Threads Using a Global Run Queue in a Multiple Run Queue System.
U.S. Appl. No. 09/506,856, filed Feb. 17, 2000, Brenner et al., Apparatus and Method for Starvation Load Balancing Using a Global Run Queue in a Multiple Run Queue System.
U.S. Appl. No. 09/506,231, filed Feb. 17, 2000.Brenner et al., Apparatus and Method for Periodic Load Balancing in a Multiple Run Queue System.

\* cited by examiner

*Primary Examiner*—Meng-Ai An
*Assistant Examiner*—Camquy Truong
(74) *Attorney, Agent, or Firm*—Duke W. Yee; Mark E. McBurney; Betty Formby

(57) ABSTRACT

Apparatus and methods for load balancing fixed priority threads in a multiprocessor system are provided. The apparatus and methods of the present invention identify unbound fixed priority threads at the top of local run queues. A best fixed priority thread is then identified and its priority checked against the priorities of threads executing on processors of the node. A set of executing threads that may be displaced by the best fixed priority thread is identified. The lowest priority executing thread from the set is then identified and the best fixed priority thread is moved to displace this lowest priority executing thread.

30 Claims, 8 Drawing Sheets

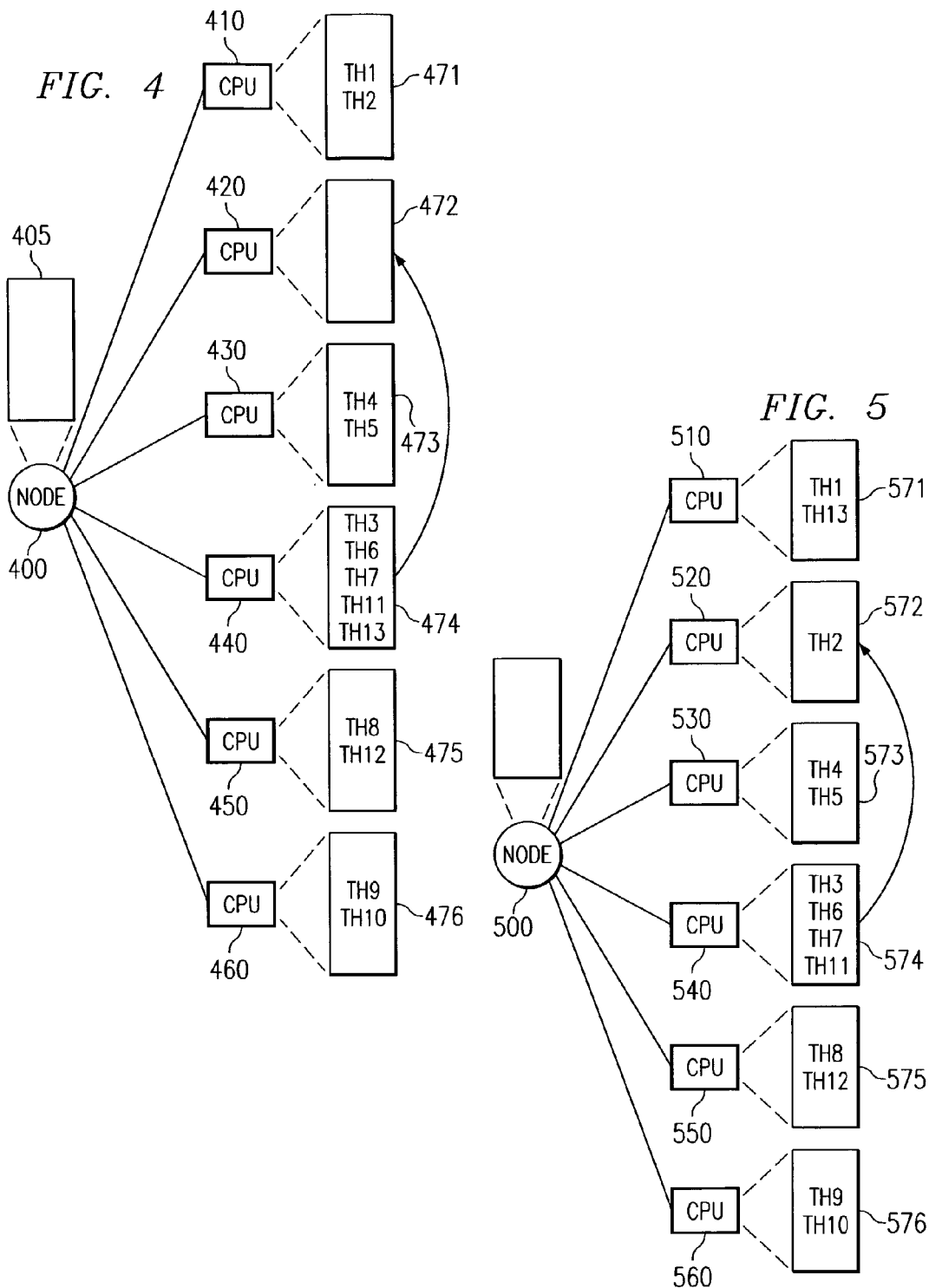

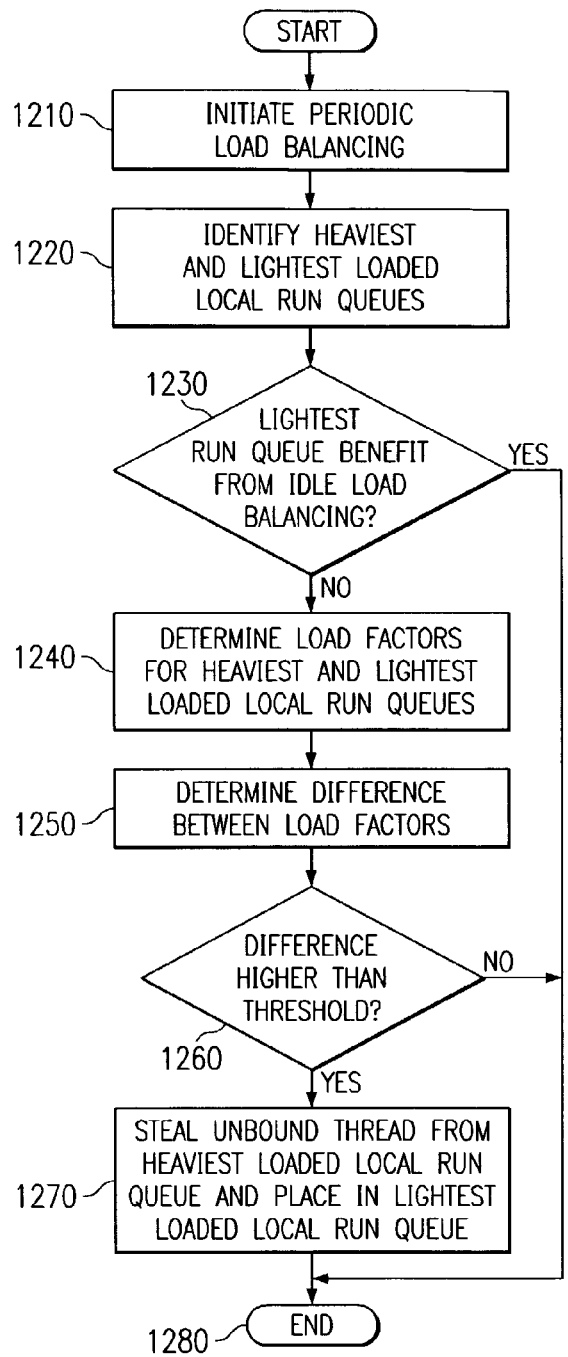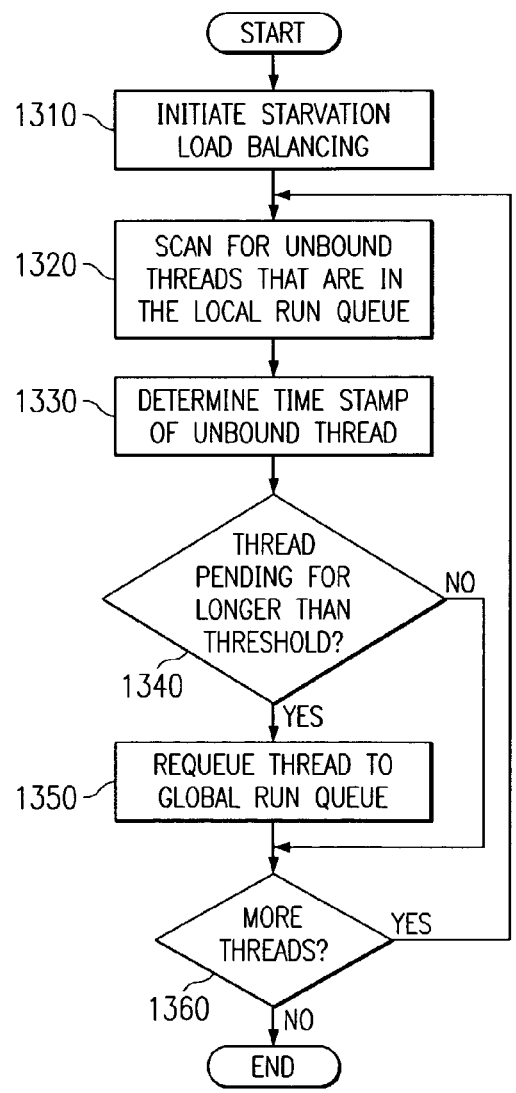

APPARATUS AND METHOD FOR LOAD BALANCING OF FIXED PRIORITY THREADS IN A MULTIPLE RUN QUEUE ENVIRONMENT

BACKGROUND OF THE INVENTION

This application is directed to similar subject matter as commonly assigned U.S. patent application Ser. No. 09/506,230 entitled "APPARATUS AND METHOD FOR DISPATCHING FIXED PRIORITY THREADS USING A GLOBAL RUN QUEUE IN A MULTIPLE RUN QUEUE SYSTEM" filed on Feb. 17, 2000, U.S. patent application Ser. No. 09/506,856 entitled "APPARATUS AND METHOD FOR STARVATION LOAD BALANCING USING A GLOBAL RUN QUEUE IN A MULTIPLE RUN QUEUE SYSTEM" filed on Feb. 17, 2000, now U.S. Pat. No. 6,748,593, and U.S. patent application Ser. No. 09/506,231 entitled "APPARATUS AND METHOD FOR PERIODIC LOAD BALANCING IN A MULTIPLE RUN QUEUE SYSTEM", filed on Feb. 17, 2000, now U.S. Pat. No. 6,658,449, which are hereby incorporated by reference in their entirety.

1. Technical Field

The invention is generally directed to an improved computing system. More specifically, the present invention is directed to mechanisms for load balancing of fixed priority threads in a multiple run queue environment.

2. Description of Related Art

Multiple processor systems are generally known in the art. In a multiple processor system, a process may be shared by a plurality of processors. The process is broken up into threads which may be processed concurrently. However, the threads must be queued for each of the processors of the multiple processor system before they may be executed by a processor.

One known technique for queuing threads to be dispatched by a processor in a multiple processor system is to maintain a single centralized queue, or "run queue." As processors become available, they take the next thread in the queue and process it. The drawback to this approach is that the centralized queue becomes a bottleneck for the threads and processing time may be lost due to processors spinning on a run queue lock, i.e. becoming effectively idle, while waiting to take the next thread from the centralized queue.

Another known technique for queuing threads is to maintain separate queues for each processor. Thus, when a thread is created, it is assigned to a processor in some fashion. With such a technique, some processors may become overloaded while other processors are relatively idle. Furthermore, some low priority threads may become starved, i.e. are not provided with any processing time, because higher priority threads are added to the run queue of the processor for which the low priority threads are waiting.

In addition to the above, system administrators (or privileged programs) may apply a fixed priority scheduling policy by which each program's scheduling priority is set to a constant value. In such policies, lower numerial priority requests receive unconditionally better service (faster execution) than higher numbered priorities, for example, without regard to resource consumption by the running program's threads. This means that if, for example, four fixed priority threads were created with respective priorities of 30, 30, 31 and 31, the system should attempt to favor the two priority 30 threads over the two priority 31 threads.

On uniprocessor (UP) computer systems and multiprocessor (MP) computer systems with a single run queue, the desired prioritization happens automatically because all resource providers, e.g., central processing units (cpus), search the same run queue and that run queue is sorted by priority. However, with the advent of the multiple run queue support, this is no longer guaranteed.

To illustrate the problem, returning to the example above, if we assume a two way MP system, it would be desirable to have one of each priority 30 and 31 threads assigned to the local run queue for each processor:

| Processor  | 0  | 1  |
|------------|----|----|
| Run queue: | 30 | 30 |
|            | 31 | 31 |

Such an arrangement would guarantee that whenever a priority 30 is runnable, i.e. available to be executed, it will run immediately in preference to the priority 31 threads. However, there currently is no mechanism that can reliably ensure such optimal arrangements of fixed priority threads. Rather, in many cases, fixed priority threads may be assigned to run queues in a non-optimal manner:

| Processor  | 0  | 1  |
|------------|----|----|
| Run queue: | 30 | 31 |
|            | 30 | 31 |

When this occurs, the second priority 30 thread is waiting for processor 0 while a priority 31 thread runs on processor 1. Existing load balancing algorithms do not provide any mechanism for improving this situation such that the priority 30 threads are executed before the priority 31 threads.

Thus, there is a need for new technology to provide apparatus and methods for load balancing with regard to fixed priority threads in a multiple run queue system.

SUMMARY OF THE INVENTION

The present invention provides apparatus and methods for load balancing fixed priority threads in a multiprocessor system having a plurality of local run queues. The apparatus and methods of the present invention identify unbound fixed priority threads at the top of local run queues. A best fixed priority thread is then identified and its priority checked against the priorities of threads executing on processors of the computing system. A set of executing threads that may be displaced by the best fixed priority thread is identified. The lowest priority executing thread from the set is then identified and the best fixed priority thread is moved to displace this lowest priority executing thread.

Thus, the present invention provides a mechanism that allows any processor in a node to execute fixed priority threads in accordance with the optimum load balancing determined by the algorithms of the present invention. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram of a node illustrating an idle load balancing method;

FIG. 5 is an exemplary diagram of a node illustrating a periodic load balancing method;

FIG. 12 is a flowchart outlining an exemplary operation of the dispatcher when performing periodic load balancing;

FIG. 13 is a flowchart outlining an exemplary operation of the dispatcher when performing starvation load balancing.

DETAILED DESCRIPTION OF THE PREFERRED EMBODIMENT

Figure 1:
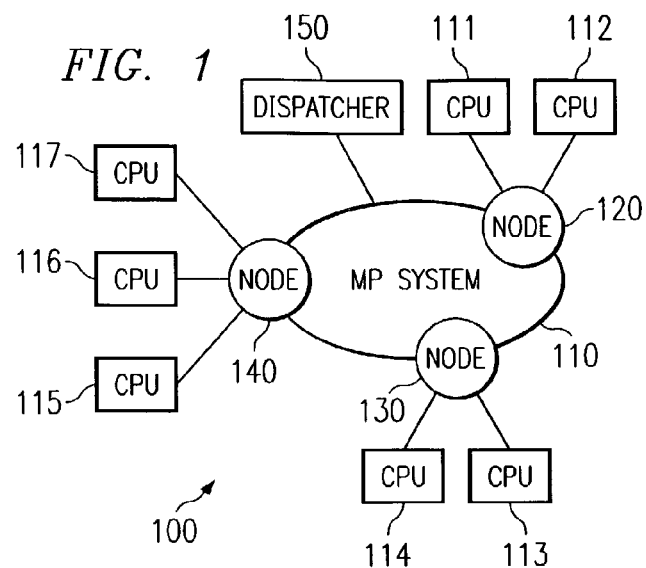
FIG. 1 is an exemplary block diagram of a multiple run queue system.

FIG. 1 is an exemplary diagram of a multiple run queue system 100 in which the present invention may be implemented. As shown in FIG. 1, the system 100 includes a multiple processor (MP) system 110, a plurality of CPUs 111–117 organized into nodes 120–140, and a dispatcher 150.

The MP system 110 may be any type of system having a plurality of processors, such as CPUs 111–117. The CPUs 111–117 are any type of processing device capable of processing assigned data processing jobs. The CPUs 111–117 are organized into nodes 120–140. The nodes 120–140 may not be actual devices in themselves, but may be considered representations of the partition of CPUs 111–117 into groups. Thus, for example, CPUs 111 and 112 are associated with node 120, CPUs 113 and 114 are contained in node 130, and CPUs 115–117 are contained in node 140.

The dispatcher 150 performs load balancing of the jobs among the nodes 120–140 and the CPUs 111–117. Although the dispatcher 150 is shown as a single centralized device, the dispatcher 150 may be distributed throughout the MP system 110. For example, the dispatcher 150 may be distributed such that a separate dispatcher 150 may be associated with each node 120–140 or a group of nodes 120–140. Furthermore, the dispatcher 150 may be implemented as software instructions run on each CPU 111–117 of the MP system 110.

Each CPU 111–117 has an associated local run queue and each node 120–140 has an associated global run queue. Thus, each CPU 111–117 services a single local run queue and each CPU 111–117 in a node 120–140 services the global run queue for that node. For example, CPUs 111 and 112 both service the global run queue associated with the node 120.

Although in the preferred embodiment there is a one-to-one correspondence between CPUs 111–117 and local run queues, the invention is not limited to such an embodiment. Rather, the local run queues may be shared by more-than one CPU in the node. Thus, for example, CPUs 115 and 116 may share a single local run queue while CPU 117 utilizes a second local run queue.

The global and local run queues are populated by threads. A thread is an individual transaction in a multithreaded environment. An environment is a multithreaded environment if the environment permits multitasking within a single program. Multithreading allows multiple streams of execution to take place concurrently within the same program, each stream processing a different transaction or message.

The global run queue of a node competes with the corresponding local run queues for CPUs to service its threads. Threads that are present in the global run queue and threads in the local run queues seek processing time from the CPUs and thus, compete on a priority basis for the CPUs' resources.

The threads in a run queue (local and global) have priorities associated with them. The run queue maintains the priority information of the highest waiting thread on the run queue in a run queue structure. The dispatcher 150 uses this priority information to make decisions of which run queue to search for the next thread to dispatch.

When both the global and local run queues have threads waiting that are of the same priority, the dispatcher 150 in general selects, as a "tie breaker," the local run queue to dispatch a thread. This preference is used because the threads on the local run queue are serviced only by its assigned CPU(s). On the other hand, the global run queue may be serviced by any CPU assigned to the node.

However, if choosing the local run queue would result in the two consecutive "tie breaks" in favor of the local run queue, the global run queue is chosen instead. The reason for this is to avoid starvation of the global run queue by repeatedly choosing the local run queue unconditionally.

When a run queue (local or global) is selected for dispatch of a thread, the dispatcher 150 attempts to lock the run queue. The terms "locking" a run queue or acquiring a "run queue's lock" refer to the dispatcher 150 restricting access to the run queue in order to avoid alterations of the run queue while the dispatcher 150 attempts to dispatch a thread.

If an attempt to lock the global run queue is unsuccessful, e.g. another CPU has locked the global run queue, the dispatcher 150 does not retry the attempt to lock the global run queue, but instead selects a local run queue and attempts to dispatch a thread from it. Retrying a lock attempt on a run queue is referred to as "spinning" on the run queue.

If an attempt to lock the global run queue is successful but there is no thread in the global run queue once the lock has been achieved, the dispatcher 150 selects a local run queue and attempts to dispatch a thread from it. If the lock is successful but the only thread in the global run queue is a thread with a different priority than expected, the dispatcher 150 dispatches the thread anyway.

The threads referred to above are "unbound" threads. A thread is "unbound" if it is not required that the thread be processed by a specific CPU. A thread is a "bound" thread if the thread contains an identifier indicating that the thread must be processed by a particular CPU or CPUs. If a thread is bound to a specific CPU, it must be queued to a local run queue serviced by that CPU.

Normally, an unbound thread, once dispatched on a given CPU, is semi-permanently associated with the local run queue served by that CPU to which the unbound thread was assigned. The exception is unbound fixed priority threads running with the POSIX (Portable Operating System Interface for UNIX) compliance flag set. As will be described further hereafter, these threads remain on the global run queue in order to guarantee that they will always be dispatched in strict priority order relative to each other.

Threads are added to the global run queue based on load balancing among the nodes 120–140 and the CPUs 111–117. The load balancing may be performed by the dispatcher 150. Load balancing includes a number of methods of keeping the various run queues of the multiple run queue system 100 equally utilized. Load balancing may be viewed as five parts: initial load balancing, idle load balancing, periodic load balancing, starvation load balancing, and fixed priority load balancing. Each of these parts will be addressed separately, however they are intended to be implemented in conjunction with one another in order to provide optimum load balancing across the MP system 110.

Furthermore, each of these parts may further be implemented in conjunction with fixed priority thread load balancing as discussed hereafter.

Initial Load Balancing

Figure 2:
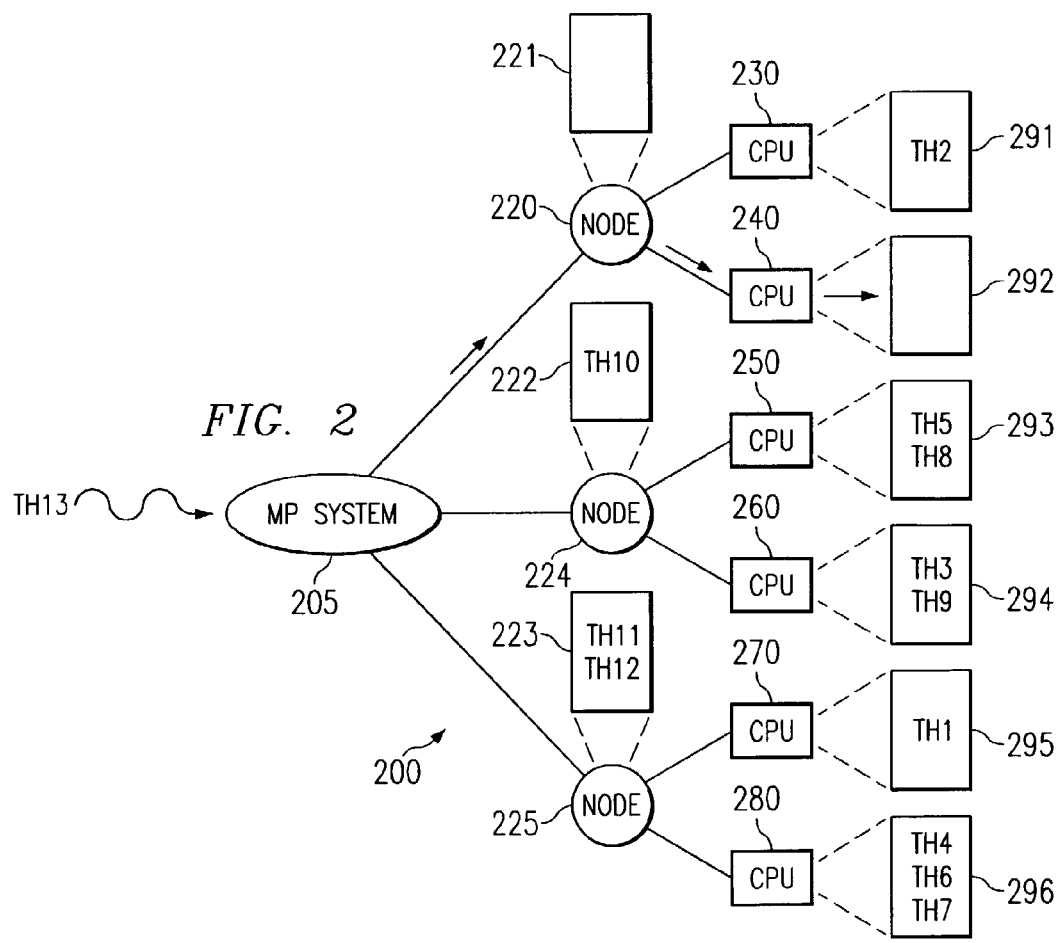
FIG. 2 is an exemplary diagram of a multiple run queue system illustrating an initial load balancing method.
Figure 3:
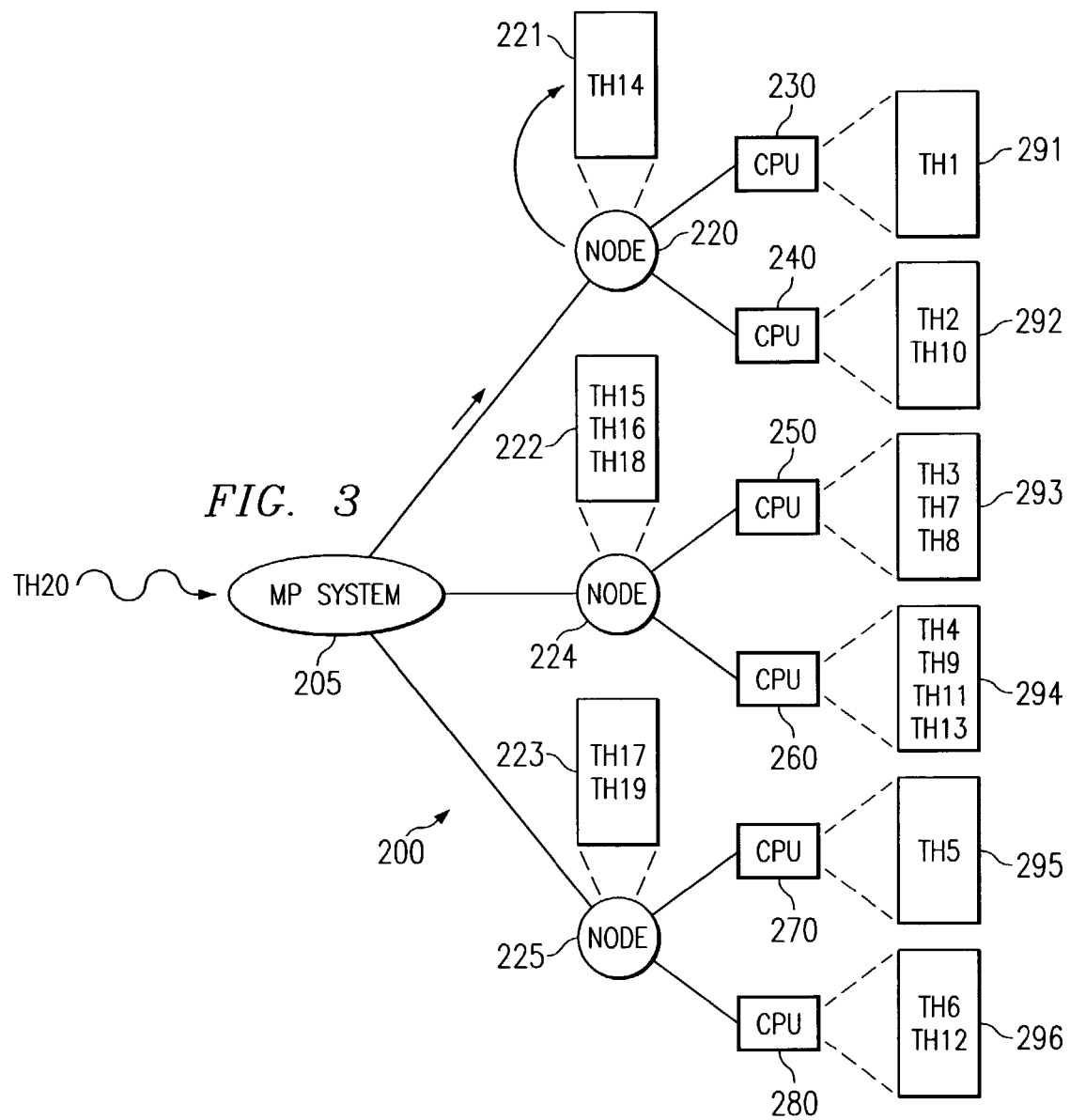
FIG. 3 is an exemplary diagram of a multiple run queue system illustrating an initial load balancing method when an idle CPU is not found.

Initial Load Balancing is the spreading of the workload of new threads across the run queues at the time the new threads are created. FIGS. 2 and 3 are exemplary diagrams of a multiple run queue system 200 illustrating the initial load balancing method.

As shown in FIG. 2, when an unbound new thread Th13 is created as part of a new process, or job, the dispatcher 150 attempts to place the thread in a run queue associated with an idle CPU. To do this, the dispatcher 150 performs a round-robin search among the CPUs 230–280 of the system 200. If an idle CPU is found, the new thread Th13 is added to the local run queue of the idle CPU.

The round-robin search begins with the node/run queue, in the sequence of node/run queues, that falls after the node/run queue to which the last thread was assigned. In this way, the method assigns new threads of a new process to idle CPUs while continuing to spread the threads out across all of the nodes and CPUs.

Thus, applying the round robin technique to the system 200 shown in FIG. 2, the new thread Th13 is assigned to the local run queue 292 associated with idle CPU 240. When the next new thread is created, the round-robin search for an idle CPU will start with CPU 250 and local run queue 293 and will progress through each of the CPUs 260 to 240 and local run queues 294 to 292 of nodes 220, 224 and 225 until an idle CPU is encountered or each CPU/local run queue has been examined.

When an unbound thread is created as part of an existing process, the dispatcher 150 again attempts to place the unbound thread on an idle CPU if one exists. However, the CPUs and corresponding local run queues that are searched are restricted to those associated with the node to which the existing process' threads were assigned. The search is restricted in this manner because it is inefficient to share an address space across a plurality of nodes.

Thus, for example, if the thread Th13 is a new unbound thread that is part of a process to which thread Th9 is a part, the round-robin search for an idle CPU is limited to node 224 and CPUs 250 and 260. Since neither of these CPUs 250 and 260 are idle, the thread Th13 would be assigned to global run queue 222 until one of the CPUs 250 and 260 becomes available to process the thread Th13. At such a time, the thread Th13 will be requeued into the local run queue 293 or 294 of the available CPU 250 or 260.

As shown in FIG. 3, if there are no idle CPUs available for the new thread Th20, the thread Th20 is assigned to the global run queue that is preferred by a round-robin search. In other words, if the thread Th20 is a new thread of a new process, the thread Th20 is assigned to the least full of the global run queues 221–223. In the system 200 shown in FIG. 3, the least full global run queue is global run queue 221. If the thread Th20 is a new thread of an existing process, the thread Th20 is assigned to the global run queue 221–223 of the node 220, 224, or 226 to which the process' threads have been assigned. Although a round-robin search is utilized by the exemplary embodiment, the invention is not limited to such an approach for assigning threads. Rather, any load placement approach may be used in place of the round robin approach described above.

With the above initial load balancing method, unbound new threads are dispatched quickly, either by assigning them to a presently idle CPU or by assigning them to a global run queue. Threads on a global run queue will tend to be dispatched to the next available CPU in the node, priorities permitting.

In addition to initial load balancing, four other methods are performed to ensure balanced utilization of system resources: idle load balancing, periodic load balancing, starvation load balancing, and fixed priority load balancing. For clarity, these load balancing methods will be described with reference to a single node and its corresponding CPUs. However, as will be apparent to one of ordinary skill in the art, these methods may be applied to any number of nodes and CPUs without departing from the spirit and scope of the invention.

Idle Load Balancing

Idle Load Balancing applies when a CPU would otherwise go idle and the dispatcher 150 (FIG. 1) attempts to shift the workload from other CPUs onto the potentially idle CPU. However, this shifting process takes into account the beneficial "cache affinity" of threads in the local run queues.

A memory cache is an interim storage that is closer to the speed of the CPU. Memory caches provide a "look-ahead" capability to speed up executing instructions, but the data may stay in the cache for a few seconds or only milliseconds.

A thread may exhibit memory cache affinity when the thread, or related threads from the same process, have been previously executed on that CPU. The "affinity" resides in that some data may still be present in the cache of the CPU and thus, the thread may be processed quicker by making use of the already cached data. In order to take into account the cache affinity while performing load balancing, the following idle load balancing method is performed.

If a CPU is about to become idle, the dispatcher 150 attempts to "steal" threads from other run queues assigned to the node for processing on the potentially idle CPU. The dispatcher 150 scans the local run queues of the node to which the potentially idle CPU is assigned for a local run queue that satisfies the following criteria:

1) the local run queue has the largest number of threads of all the local run queues of the node;
2) the local run queue contains more threads than the node's current steal threshold (defined hereafter);
3) the local run queue contains at least one unbound thread; and
4) the local run queue has not had more threads stolen from it than a maximum steal threshold for the current clock cycle.

If a local-run queue meeting these criteria is found, the dispatcher 150 attempts to steal an unbound thread from that local run queue. A thread is stolen from the local run queue after obtaining the selected local run queue's lock. If the local run queue's lock cannot be obtained immediately, repeated attempts are not made.

If the local run queue's lock is obtained, the dispatcher 150 verifies that an unbound thread is still available and the unbound thread with the most favored priority is chosen. The thread is stolen from the local run queue by obtaining the thread's lock and changing the thread's run queue pointer to the run queue pointer for the local run queue assigned to the potentially idle CPU. Again, if the thread's lock is not obtained immediately, the steal attempt is abandoned.

If the thread's lock is obtained and the thread is stolen, the stolen thread is then immediately processed by the CPU and is not actually queued in the local run queue of the potentially idle CPU. This result follows naturally after the stolen thread has completed a dispatch cycle, assuming typical behavior.

Idle load balancing is constrained by the node's steal threshold. The steal threshold is a fraction of the smoothed average load factor on all the local and global run queues in the node. This load factor is determined by sampling the number of threads on each local run queue at every clock cycle.

For example, if the load factors of the CPUs is 5, 15 and 16 over a period of time, the smoothed average load factor might be 12. The steal threshold may be, for example, ¼ of the smoothed average load factor and thus, may be 3. The steal threshold (¼ in this example) is actually a tunable value.

Accordingly, the local run queue from which threads are to be stolen must have more than 3 threads in the local run queue, at least one of which must be an unbound thread and thus, stealable. The local run queue must also have the largest number of threads of all of the local run queues and must not have had a maximum number of threads stolen from it over the current clock cycle. As an example of the above method, consider the node shown in FIG. 4. As shown in FIG. 4, CPU 420 is becoming idle and its associated local run queue 472 and global run queue 405 have no assigned threads. Thus, the idle CPU 420 attempts to steal a thread from another local run queue 471, 473–476.

Taking the above steal criteria into consideration, the local run queue satisfying the above criteria is local run queue 474. This is because local run queue 474 has the most threads of all of the local run queues 471–476 (5 threads). The local run queue 474 contains at least one unbound thread (this is assumed). The local run queue 474 has not reached its maximum number of stolen threads limit (this is also assumed).

The local run queue 474 contains more threads than the node's current steal threshold assuming that the current local run queue workloads represent the average load factors of the local run queues. The steal threshold for the node 400 is currently approximately 1 and the local run queue 474 has 5 assigned threads. Thus, the local run queue 474 meets all of the above steal criteria. Hence, the first unbound thread in local run queue 474 is stolen and its run queue pointer reassigned to local run queue 472.

Periodic Load Balancing

Periodic load balancing is performed every N clock cycles and attempts to balance the workloads of the local run queues of a node in a manner similar to that of idle load balancing. However, periodic load balancing is performed when, in general, all the CPUs have been 100% busy.

Periodic load balancing involves scanning a node's local run queues to identify the local run queues having the largest and smallest number of assigned threads on average, i.e., the local run queues with the highest and lowest load averages, hereafter referred to as the heaviest and lightest local run queues, respectively. If the lightest local run queue has stolen a thread through idle load balancing in the last N clock cycles, periodic load balancing may not performed. This is because periodic load balancing is directed to addressing the situation where idle load balancing is not occurring and all of the node's CPUs are busy. In addition, this prevents a local run queue that has benefited from idle load balancing from being locked for two consecutive cycles.

If the difference in load factors between the heaviest and lightest local run queues is above a determined threshold, such as 1.5 for example, periodic load balancing may be performed. If the difference is less than the threshold, it is determined that the workloads of the CPUs are well balanced and periodic load balancing is not performed.

If periodic load balancing is to be performed, the dispatcher 150 acquires the heaviest local run queue's lock. In this case, if the lock is not acquired immediately, the dispatcher 150 will make repeated attempts to acquire the local run queue's lock, i.e. the dispatcher 150 will spin on the local run queue's lock. Once the local run queue's lock is obtained, the dispatcher 150 scans the local run queue for an unbound thread to steal. The scan for stealable unbound threads starts at threads having a medium priority in order to increase the likelihood of stealing a thread that will use enough CPU time to have an impact on the system performance and also to leave high priority threads with their original CPUs. The thread is then stolen in the same manner as described above.

As an example of periodic load balancing, consider the node 500 shown in FIG. 5. As shown in FIG. 5, each of the CPUs 510–560 are busy with dispatching threads in their respective local run queues 571–576. However, the workloads among the CPUs 510–560 are not balanced. Periodic load balancing finds the heaviest and lightest local run queues, which in this case are local run queues 574 and 572, for example.

Assume that the load factor for local run queue 574 is 4 and the load factor for local run queue 572 is 1. The difference between the load factors is 3 which is higher than 1.5 indicating that the workloads of the local run queues 571–576 are not balanced.

Accordingly, the dispatcher 150 obtains the lock for local-run queues 574 and 572 and steals the first unbound thread in local run queue 574 and places it in local run queue 572. In order to avoid having to hold two local run queue 572 and 574 locks at the same time, the stolen thread may be temporarily dequeued and placed in a temporary queue (not shown). The lock on the local run queue 574 may then be released and the lock for the local run queue 572 acquired. The thread may then be requeued in local run queue 572.

Starvation Load Balancing

Starvation Load Balancing is directed to moving unbound threads which have not been dispatched within a predetermined period of time to a global run queue. In this way, undispatched threads from local run queues may be moved to the global run queue where there is a greater likelihood that they will be assigned to a local run queue for a CPU that may be able to dispatch them.

With the starvation load balancing method, each thread is time stamped when it is assigned to a local run queue. At periodic intervals, the dispatcher 150 scans each of the threads in the system to find unbound threads that have been pending on a local run queue for greater than a threshold time amount, for example, greater than 1.5 seconds. If the dispatcher 150 finds any unbound threads meeting this criteria, the dispatcher 150 steals the thread from the local run queue and places it in the global run queue for the node.

In this way, the thread will be dispatched by the next available CPU in the node, priority permitting. Thus, a low priority thread that may not be dispatched due to higher priority threads in one local run queue, may be requeued to a less busy local run queue and will have a greater likelihood of being dispatched.

In addition, by moving threads that are not being dispatched to the global run queue, there is a greater likelihood that load balancing will achieve the desired effect. For example, if a local run queue has a large number of undispatched threads, load balancing will tend to cause dispatching threads to be placed in other local run queues. By removing the undispatched threads to the global run queue, dispatching threads will be spread more evenly among the local run queues.

Figure 6:
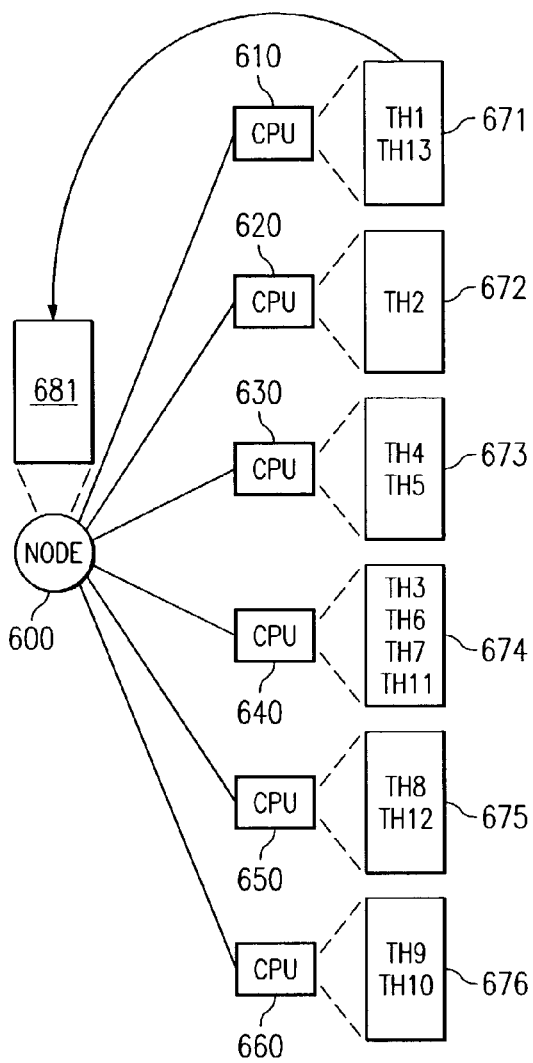
FIG. 6 is an exemplary diagram of a node illustrating a starvation load balancing method.

As an example of starvation load balancing, consider the node 600 in FIG. 6. As shown in FIG. 6, the local run queue 671 includes an unbound thread that has not been dispatched within a threshold amount of time. This unbound thread is located by the dispatcher 150 by scanning the threads of the system, in a single operation, for unbound threads in each of the local run queues 671–676 having time stamps that indicate they have been pending in the local run queue for a time longer than the threshold amount of time.

Once the unbound thread is located, the dispatcher 150 obtains the lock for the local run queue 671 and steals the thread from the local run queue 671 and places it in the global run queue 681. The next available CPU 610–660 allowed to service a thread at the given thread's priority will dispatch the thread, after which it will be assigned to that local run queue 671–676.

Thus, initial, idle, periodic and starvation load balancing are used to achieve an optimum load balance among CPU resources. In this way, CPU resources may be equally utilized and the overall throughput of the system may be increased substantially.

Fixed Priority Thread Load Balancing

Under certain conditions, threads must be dispatched in a fixed priority order. For example, in the AIX (Advanced Interactive eXecutive) operating system, POSIX compliant processes require that the threads be dispatched in strict priority order. In a multiple run queue system, such as that of the prior art, dispatching threads in strict priority order may not be performed or may require that all of the threads be dispatched to a single CPU or assigned permanently to the global run queue with its inherent additional overheads.

The present invention avoids this problem by periodically or continuously checking each of the local run queues of a node to determine if any of the local run queues have an unbound fixed priority thread (hereafter only referred to as fixed priority threads) waiting at the top of the local run queue, i.e. next in line to be processed by the local run queue's processor or processors. Each local run queue may have an associated flag that identifies whether or not that local run queue has a fixed priority thread at the top of the corresponding local run queue waiting to be processed. This flag may be set by examining flags associated with the individual threads in the local run queue that identify whether the thread is a fixed priority thread or not.

In order to identify the fixed priority threads, the threads must have attribute information that includes a fixed priority flag that may be set when the thread is to be treated as a fixed priority thread. When this flag is set, the dispatcher 150, while performing fixed priority thread load balancing according to the present invention, will identify the thread as a fixed priority thread and attempt to perform load balancing in order to expedite execution of the fixed priority thread and avoid long-term waiting of threads in local run queues. In this way, fixed priority threads may be utilized with the multiple run queue system so as to achieve the scheduling behavior intended by virtue of their fixed priorities.

If there are fixed priority threads at the top of local run queues, the "best" fixed priority thread is identified. The "best" fixed priority thread is a fixed priority thread, in the set of fixed priority threads identified as being at the top of local run queues, that has a highest priority (and thus a lowest numerical value) relative to the other fixed priority threads in this set of fixed priority threads.

The priority of the currently running thread is kept in a structure associated with each processor rather than in the run queue, since a run queue may eventually be shared by multiple processors. In the run queue, a best waiting thread priority indicator and a flag that indicates that this best waiter is a fixed priority waiter are maintained. Of course, the best waiting thread priority indicator and the fixed priority flag are updated as threads enter and leave the run queue. From this information, the priority of the "best" fixed priority thread may be obtained.

Thereafter, the priorities of the threads (either fixed or not fixed priority threads) being executed by the other processors in the node are examined. A determination is made as to whether any of these executing threads could be displaced by the best waiting fixed priority thread. In other words, a comparison of the priority of the best fixed priority thread is made with the priorities of the executing threads. In a preferred embodiment, these operations are performed without obtaining a lock on the processor local run queues.

A set of executing threads is identified that have priorities that are lower than the best fixed priority thread. A lowest priority executing thread from this set of executing threads is then identified and an attempt is made to reassign the best waiting fixed priority thread to the processor executing the lowest priority executing thread. This will require a lock attempt on the processor local run queue and moving of the best waiting fixed priority thread from its original local run queue to the local run queue of the processor whose executing thread is to be displaced. The fixed priority thread is placed at the top of the run queue associated with the processor running the thread that is to be displaced and a flag is set requesting that the owning processor preempt the currently running thread. The preempt does not happen immediately, but only when the owning processor reaches a point in its execution where it can test for this situation. In an optional mode of system operation, a hardware interrupt may be generated to the owning processor to speed this process along. Assuming that the preemption of the running thread occurs, the running thread is returned to the run queue for that processor.

It should be appreciated that during the lock attempt, the situation regarding the threads in the run queues may change due to readying of higher priority threads, completion of execution of threads, and the like. As a result, the best waiting thread may not be moved to the local run queue of the executing thread that is to be displaced. This is satisfactory since the aim of the fixed priority load balancing mechanisms of the present invention is to correct long-term priority unfairness occurring rather than the occasional non-optimum load balancing.

The checking of local run queues to see if a fixed priority thread is waiting and then of checking all other processors to see if the fixed priority thread could be better served elsewhere carries significant overhead. Thus, in a preferred embodiment, the checking according to the present invention is performed on a periodic basis, such as 10 times a second, rather than continuously. However, in systems where such overhead is not a problem, continuous checking may be used without departing from the spirit and scope of the present invention.

Thus, rather than forcing all fixed priority threads to be executed on the same processor, any processor of the node may execute a fixed priority thread based on the load balancing of the present invention. Thus, with the present invention, it is possible to move fixed priority threads if they are being "mistreated" over time in a priority sense, while otherwise retaining the benefits of semi-permanent local run queue assignment, i.e. cache affinity. After only a few iterations of the load balancing algorithms of the present invention, the fixed priority threads will be well balanced across the local run queues of the system and may be left alone to run efficiently where they are.

Figure 7:
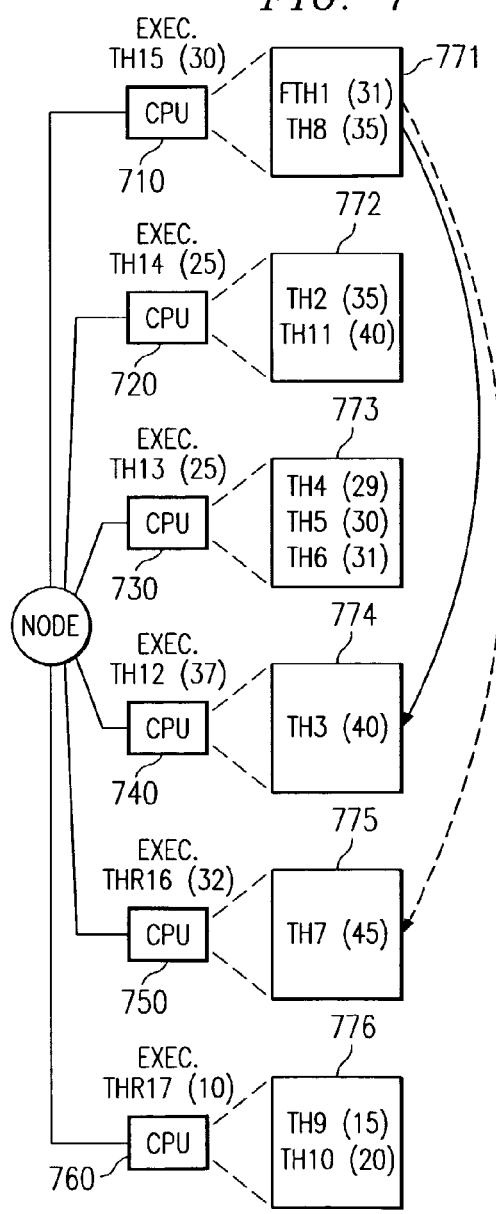
FIG. 7 is an exemplary diagram illustrating an operation of the dispatcher when performing load balancing with regard to fixed priority threads.
Figure 8:
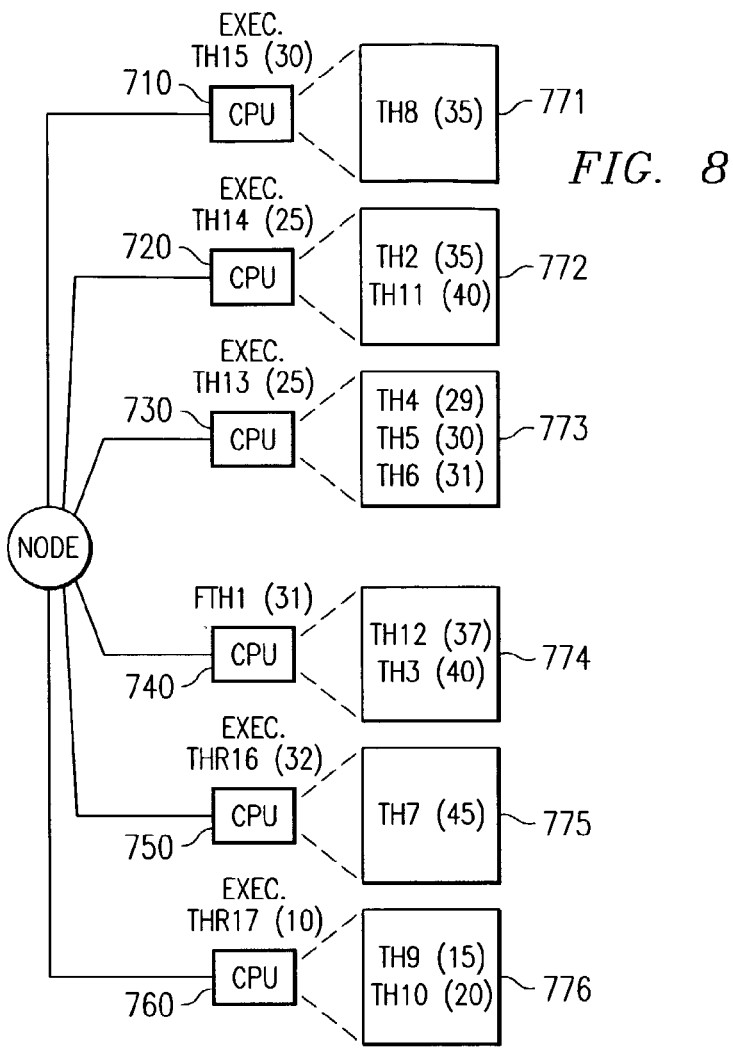
FIG. 8 is an exemplary diagram illustrating the result of load balancing fixed priority threads using the present invention and the example of FIG. 7.

FIGS. 7 and 8 illustrate the fixed priority load balancing operation of the present invention with regard to an exemplary embodiment. As shown in FIG. 7, a local run queue 771 contains a fixed priority thread FTh1 that is at the top of the local run queue 771, i.e. it is the next thread to be executed by processor 710. During a scan of these local run queues, the dispatcher 150 of the present invention will identify this thread as a fixed priority thread and attempt to perform fixed priority load balancing in accordance with the present invention.

The fixed priority thread FTh1 has a priority of 31 (priorities of threads are shown in FIGS. 7 and 8 in parenthesis next to their corresponding threads). The dispatcher 150 of the present invention scans the processors 720–760 to identify the priorities of the threads being executed. In the illustrated example, processor 720 is executing a thread having priority 25, processor 730 is executing a thread having priority 25, processor 740 is executing a thread having priority 37, processor 750 is executing a thread having priority 32, and processor 760 is executing a thread having priority 10. Thus, the set of processors, and thus local run queues, having executing (or running) threads that may be displaced by the fixed priority thread FTh1 includes processors 740 and 750, corresponding to local run queues 774 and 775.

With the present invention, the fixed priority thread FTh1 is moved to the top of the local run queue of the lowest priority executing thread that can be displaced by the fixed priority thread FTh1. In the example, this would be local run queue 774 of processor 740 since the thread being executed by processor 740 has a priority of 37 and the thread being executed by processor 750 has a priority of 32.

FIG. 8 illustrates the result of fixed priority thread load balancing according to the present invention and the example shown in FIG. 7. As shown in FIG. 8, the fixed priority thread FTh1 is now being executed by processor 740 and the previously executing thread Th12 is sent back to the top of the local run queue 774. Thus, rather than threads having lower priorities than the fixed priority thread being executed while the fixed priority thread waits on a processor, the present invention provides a load balancing approach that allows fixed priority threads to receive better service and thus, avoid long-term mistreatment of fixed priority threads.

Figure 9:
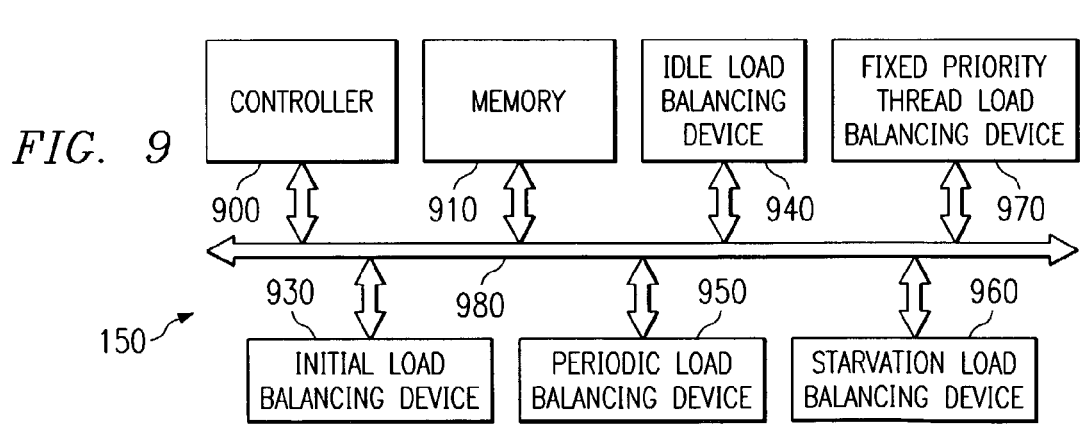
FIG. 9 is an exemplary block diagram of the dispatcher of FIG. 1.

FIG. 9 is an exemplary block diagram of the dispatcher 150 of FIG. 1. As described above, the dispatcher 150 is depicted as a centralized device. However, the invention may be implemented using a distributed dispatcher 150 where, for example, each node or group of nodes has a separate associated dispatcher 150.

Furthermore, each CPU may have an associated dispatcher 150. In such an embodiment, certain load balancing functions may be performed by the dispatchers 150 of each CPU while others may be performed by only certain ones of the dispatchers 150. For example, each dispatcher 150 associated with each CPU may perform idle load balancing when the CPU becomes idle, whereas only the dispatcher 150 associated with a master CPU in a node (usually the lowest numbered CPU) may perform periodic load balancing and starvation load balancing.

As shown in FIG. 9, the dispatcher 150 includes a controller 900, a memory 910, an initial load balancing device 930, an idle load balancing device 940, a periodic load balancing device 950, a starvation load balancing device 960, and a fixed priority thread load balancing device 970. These elements 900–970 communicate with one another via the signal/control bus 980. Although a bus architecture is shown in FIG. 9, the invention is not limited to such an architecture. Rather, any type of architecture that allows for communication among the elements 900–970 is intended to be within the spirit and scope of the present invention.

The controller 900 controls the operation of the dispatcher 150 based on, for example, control programs stored in the memory 910. The controller 900 transmits and receives information to and from the nodes via the MP system interface 920. The controller 900 utilizes the initial load balancing device 930 to perform initial load balancing in the manner described above when new threads are generated by a process in the MP system 100. The controller 900 utilizes the idle load balancing device 940 to perform idle load balancing in the-manner described above when information is received from a node that a CPU in the node is about to become idle. The controller 900 utilizes the periodic load balancing device 950 to perform periodic load balancing in the manner described above. The starvation load balancing device 960 is utilized to perform starvation load balancing also in the manner described above.

The initial load balancing device 930, idle load balancing device 940, periodic load balancing device 950, starvation load balancing device 960, and fixed priority load balancing device 970 may be, for example, programmed microprocessor devices or micro controller and peripheral integrated circuit elements, an Application Specific Integrated Circuit (ASIC) or other integrated circuit, a hardware electronic or logic circuit such as a discrete element circuit, a programmable logic device such as a PLD, PLA, FPGA or PAL, or the like. In short, any device capable of performing the functions described above and illustrated in the flowcharts of FIGS. 10–14, described hereafter, may be used without departing from the spirit and scope of the present invention.

Figure 10:
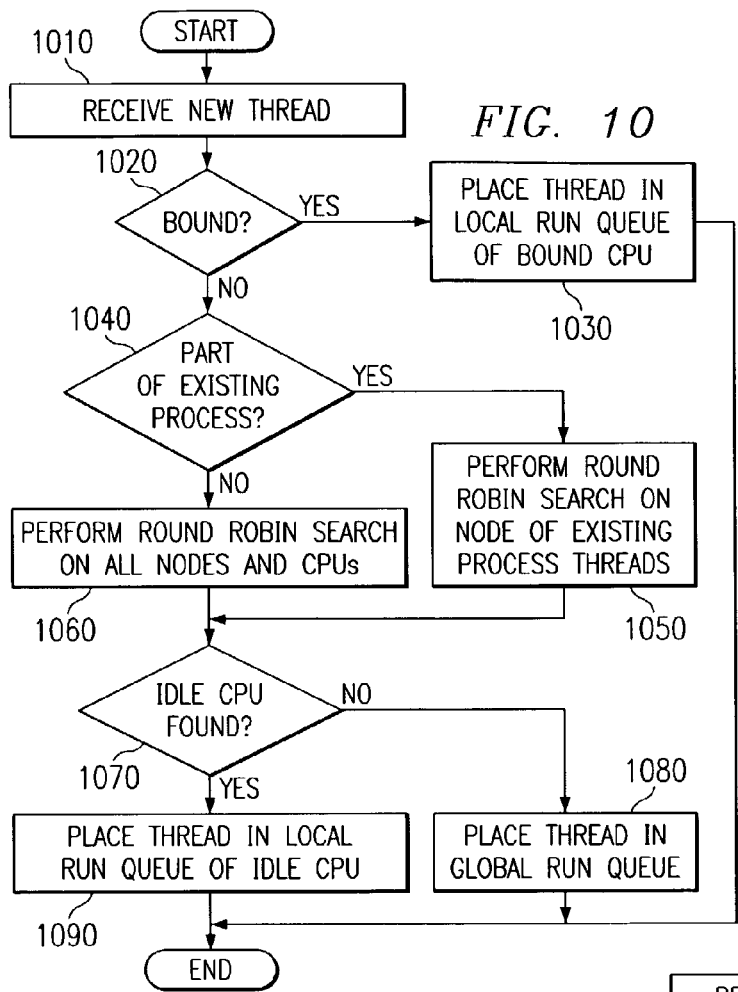
FIG. 10 is a flowchart outlining an exemplary operation of the dispatcher when performing initial load balancing.

FIG. 10 is a flowchart outlining an exemplary operation of the dispatcher 150 when performing initial load balancing. The operation starts with the controller 900 receiving a new thread to be dispatched by a CPU (step 1010).

The controller 900 then determines if the new thread is a bound or unbound thread (step 1020). This may be performed by reading attribute information associated with the thread indicating whether or not the thread is bound to a particular CPU or is unbound. If the thread is bound (step 1020: YES), the controller 900 places the new thread in the local run queue associated with the bound CPU (step 1030). If the new thread is unbound (step 1020: NO), the controller 900 instructs the initial load balancing device 930 to perform initial load balancing. The initial load balancing device 930 determines if the new thread is part of an existing process (step 1040). This may also be performed by reading attribute information associated with the thread.

If the new thread is part of an existing process (step 1040: YES), the initial load balancing device 930 performs a round robin search of the CPUs of the node to which the other threads from the existing process were assigned (step 1050) looking for an idle CPU. If the new thread is not part of an existing process (step 1040: NO), the initial load balancing device 930 performs a round robin search of all nodes and CPUs for an idle CPU (step 1060).

The initial load balancing device 930 determines whether or not an idle CPU is found (step 1070) and places the new thread in the local run queue of the idle CPU if one is found (step 1090). If an idle CPU is not found, the initial load balancing device 930 places the new thread in the global run queue (step 1080). If the new thread is part of an existing process, the global run queue to which the new thread is added is the global run queue for the node to which the other threads of the existing process, or the thread which created the current thread, were assigned. If the new thread is not part of an existing process, the global run queue to which the new thread is added is the global run queue preferred based on, for example, a round robin search, although other load placement approaches may be used instead of the round robin search. This is generally the global run queue with the least number of threads.

Figure 11:
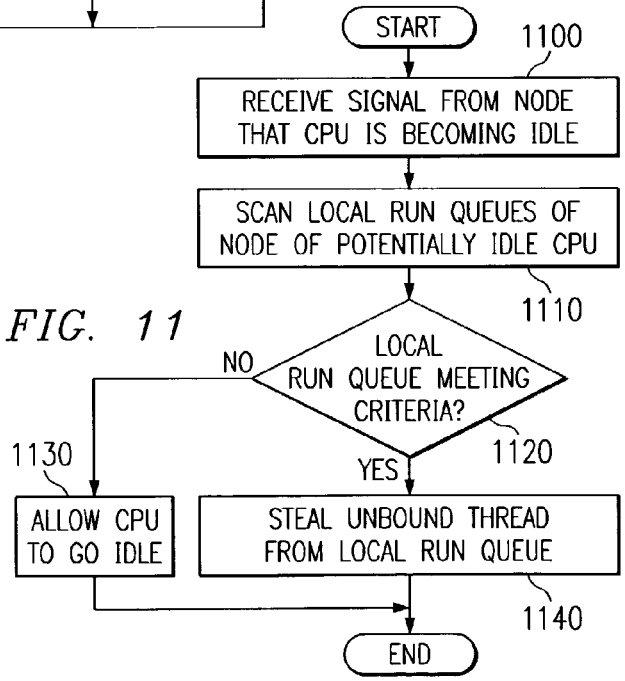
FIG. 11 is a flowchart outlining an exemplary operation of the dispatcher when performing idle load balancing.

FIG. 11 is a flowchart outlining an exemplary operation of the dispatcher 150 when performing idle load balancing. As shown in FIG. 11, the operation starts when the controller 900 instructs the idle load balancing device 940 to perform idle load balancing.

Accordingly, the idle load balancing device 940 scans the local run queues of the node of the potentially idle CPU looking for a local run queue meeting the above described idle load balancing criteria (step 1110). If a local run queue meeting the idle load balancing criteria is found (step 1120: YES), the idle load balancing device 940 steals a thread from the local run queue meeting the criteria (step 1140). Alternatively, each local run queue meeting the idle load balancing criteria may be identified and then a best candidate may be identified from these local run queues from which a thread may be stolen. If a local run queue meeting the idle load balancing criteria is not found (step 1120: NO), the idle load balancing device 940 allows the CPU to go idle (step 1130).

FIG. 12 is an outline of an exemplary operation of the dispatcher 150 when performing periodic load balancing. As shown in FIG. 12, the operation starts when the controller 900 instructs the periodic load balancing device 950 to initiate periodic load balancing (step 1210). This may be performed, for example, based on a periodic timing of the operation.

The periodic load balancing device 950 identifies the heaviest and lightest loaded local run queues and determines the load factors for the heaviest and lightest loaded local run queues (step 1220). The periodic load balancing device 950 then determines if the lightest loaded local run queue has benefited from idle load balancing in the previous clock cycle (step 1230). This may be performed by determining the current setting of a flag in the internal structure representing the local run queue.

If the lightest loaded local run queue did benefit from idle load balancing in the previous clock cycle (step 1230: YES), periodic load balancing is not performed (step 1270).

If the lightest loaded local run queue did not benefit from idle load balancing in the previous clock cycle (step 1230: NO), the periodic load balancing device 950 determines the difference between these load factors (step 1240) and determines if the difference is higher than a threshold amount (step 1250).

If the difference between the load factors is higher than a threshold amount (step 1250: YES), the periodic load balancing device 950 steals an unbound thread from the heaviest loaded local run queue and places it in the lightest loaded local run queue (step 1260). If the difference between the load factors is not higher than the threshold amount (step 1250: NO), the system is well balanced and load balancing is not performed (step 1270).

FIG. 13 is a flowchart outlining an exemplary operation of the dispatcher 150 when performing starvation load balancing. As shown in FIG. 13, the operation starts when the controller 900 instructs the starvation load balancing device 960 to perform starvation load balancing (step 1310). This may be performed, for example, based on a periodic timing of the operation.

The starvation load balancing device 960 scans each of the threads in the system for an unbound thread (step 1320). The starvation load balancing device 960 determines the time stamp for the unbound thread (step 1330) and determines if the time stamp indicates that the unbound thread has been pending in a local run queue for longer than a threshold amount of time (step 1340).

If the unbound thread has been pending for longer than the threshold amount of time (step 1340: YES), the starvation load balancing device 960 requeues the unbound thread to the global run queue of the node containing the thread's local run queue. If the unbound thread has not been pending for longer than the threshold amount of time (step 1340: NO), then the unbound thread is left in the local run queue. The starvation load balancing device 960 then determines if there are more threads to search and if so (step 1360: YES), performs the operation repeatedly (steps 1320–1360). If there are no more threads to be searched (step 1360: NO), the operation is ended.

With the present invention, load balancing is achieved in a multiple run queue system by using both global and local run queues. Initial load balancing, idle load balancing, periodic load balancing, and starvation load balancing are performed in conjunction with one another to ensure optimum load balancing among the local run queues.

Figure 14:
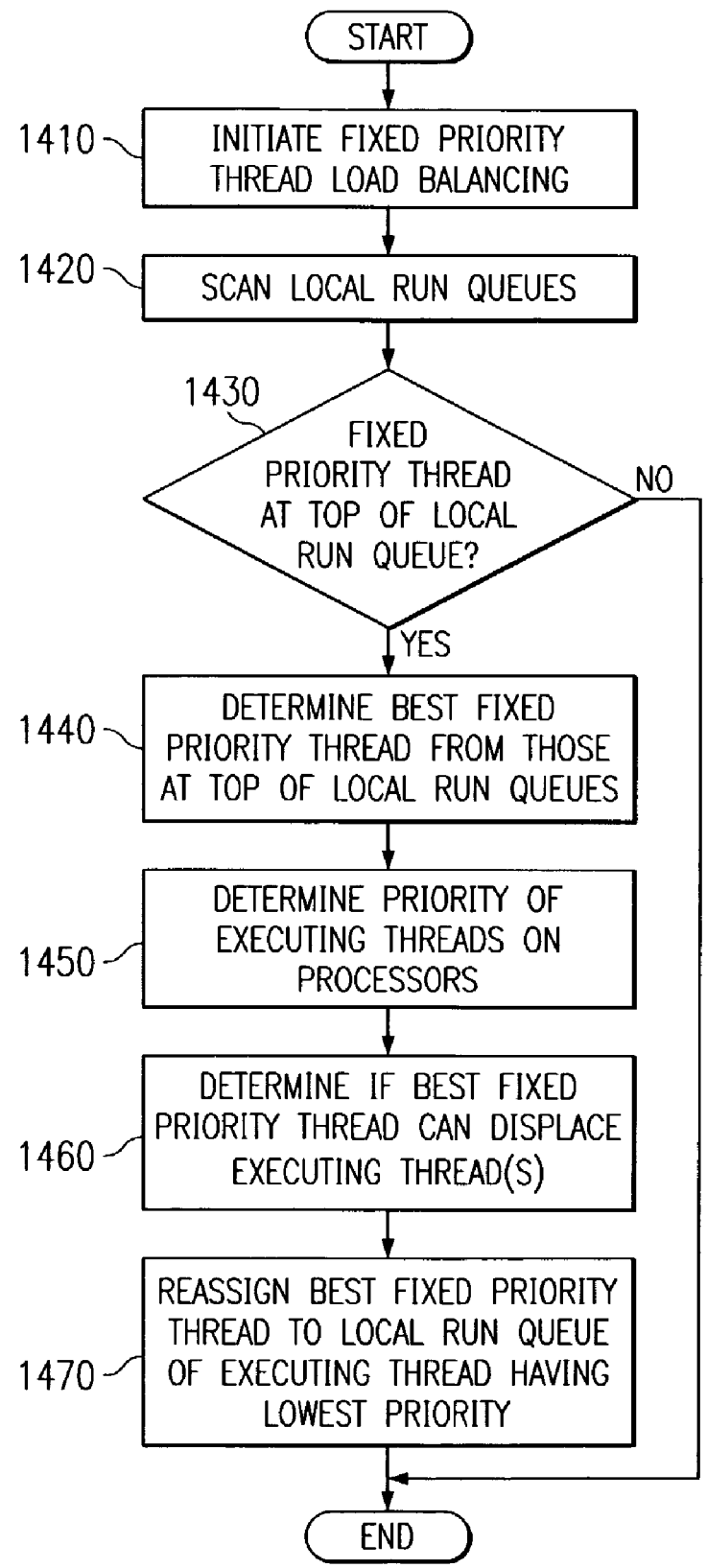
FIG. 14 is a flowchart outlining an exemplary operation of the present invention when performing load balancing of fixed priority threads.

FIG. 14 is a flowchart outlining an exemplary operation of a fixed priority thread load balancing mechanism of the present invention. As shown in FIG. 14, the operation starts with the initiation of the fixed priority thread load balancing operation (step 1410). Thereafter, the local run queues for the node are scanned to identify a set of unbound fixed priority threads at the top of the local run queues (step 1420). A determination is made as to whether any fixed priority threads at the top of local run queues were identified (step 1430). If not, the operation ends.

If at least one fixed priority thread is identified as being at the top of a local run queue, a determination is made as to the best fixed priority thread from those fixed priority threads identified as being at the top of local run queues (step 1440). As mentioned previously, the "best" fixed priority thread may be identified as the fixed priority thread that, relative to the other fixed priority threads at the top of local run queues, has a highest priority.

The priorities of executing threads on processors of the system are then identified (step 1450) and a determination is made as to whether the best fixed priority thread can displace any of the executing threads (step 1460). If the best fixed priority thread can displace any of the executing threads, then the best fixed priority thread is reassigned to the local run queue of the executing thread having the lowest priority that can be displaced by the best fixed priority thread (step 1470) and the operation ends.

The fixed priority load balancing of the present invention may be used in conjunction with initial, idle, periodic, and starvation load balancing as discussed above. However, at times, equalizing the load on processors using the initial, idle, periodic and starvation load balancing mechanisms may operate in direct conflict with fixed priority load balancing. Slight modification of these load balancing mechanism may be made to accommodate the combination of these load balancing mechanisms with the fixed priority load balancing mechanism.

For example, a fixed priority load balancing operation may be performed first, and, if the result of such fixed priority load balancing is the movement of a thread, periodic load balancing may not occur at this point. Furthermore, the periodic load balancing mechanism may not move a fixed priority thread to the disadvantage of that thread.

Thus, the present invention provides a mechanism for performing load balancing on fixed priority threads such that they need not be executed by the same processor or set of processors. Rather, with the present invention, the fixed priority threads may be executed by any processor in a node in accordance with the optimal arrangement of threads in local run queues as determined by the algorithms of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing fixed priority threads in a multiple processor system having a plurality of processors, the multiple processor system having a plurality of local run queues, each of the plurality of processors being associated with at least one of the plurality of local run queues, the method comprising:
    dispatching a plurality of threads to ones of the plurality of local run queues, said plurality of threads including a plurality of fixed priority threads; and
    performing fixed priority load balancing on the plurality of local run queues, the fixed priority load balancing including the stens of
        identifying a first local run queue from the plurality of local run queues, the first local run queue having a fixed priority thread at the top of the first local run queue,
        identifying an executing thread on one of the plurality of processors, the executing thread having a lower priority than the fixed priority thread, and
        displacing the executing thread with the fixed priority thread.

2. The method of claim 1, wherein identifying a first local run queue includes identifying a fixed priority thread on the first local run queue by processing thread attribute information identifying threads as either fixed priority threads or a non-fixed priority threads.

3. The method of claim 1, wherein identifying a first local run queue includes examining a flag associated with each local run queue in the plurality of local run queues, without obtaining a lock on the local run queues, the flag identifying whether or not a corresponding local run queue has a fixed priority thread at a top of the corresponding local run queue.

4. The method of claim 1, wherein identifying a first local run queue from the plurality of local run queues includes identifying a set of local run queues from the plurality of local run queues, the set of local run queues being local run queues that each have a fixed priority thread being next to be processed by a corresponding processor.

5. The method of claim 4, wherein the fixed priority thread at the top of the first local run queue is a fixed priority thread having a highest priority relative to other fixed priority threads identified in the set of local run queues.

6. The method of claim 1, wherein identifying an executing thread on one of the plurality of processors includes determining a subset of other local run queues of the plurality of local run queues that are associated with a processor having a running thread of less priority than the fixed priority thread.

7. The method of claim 6, wherein displacing the executing thread with the fixed priority thread includes assigning the fixed priority thread to one of the local run queues in the subset of other local run queues.

8. The method of claim 7, wherein assigning the fixed priority thread to one of the local run queues in the subset of other local run queues includes:
    identifying a lowest priority executing thread that is executing on a processor; and
    assigning the fixed priority thread to a local run queue associated with the processor on which the lowest priority executing thread is executing.

9. The method of claim 1, wherein the method is performed at periodic intervals.

10. The method of claim 1, wherein the steps of identifying a first local run queue from the plurality of local run queues and identifying an executing thread on one of the plurality of processors are performed without obtaining locks on the local run queues.

11. A computer program product having instruction in a computer readable medium for managing fixed priority threads in a multiple processor system having a plurality of processors, the multiple processor system having a plurality of local run queues, each of the plurality of processors being associated with at least one of the plurality of local run queues, the computer program product comprising:

instructions for dispatching a plurality of threads to ones of the plurality of local run queues, said plurality fo threads including a plurality of fixed priority threads; and instructions for performing fixed priority load balancing on the plurality of local run queues, wherein the instructions for performing fixed priority load balancing include instructions for identifying a first local run queue from the plurality of local run queues, the first local run queue having a fixed priority thread at the top of the first local run queues, instructions for identifying an executing thread on one of the plurality of processors, the executing thread having a lower priority than the fixed priority threads, and instructions for displacing the executing thread with the fixed priority thread.

12. The computer program product of claim 11, wherein the instructions for identifying a first local run queue include instructions for identifying a fixed priority thread on the first local run queue by processing thread attribute information identifying threads as either fixed priority threads or a non-fixed priority threads.

13. The computer program product of claim 12, wherein the first instructions for identifying a first local run queue includes instructions for examining a flag associated with each local run queue in the plurality of local run queues, without obtaining a lock on the local run queues, the flag identifying whether or not a corresponding local run queue has a fixed priority thread at a top of the corresponding local run queue.

14. The computer program product of claim 11, wherein the instructions for identifying a first local run queue from the plurality of local run queues include instructions for identifying a set of local run queues from the plurality of local run queues, the set of local run queues being local run queues that each have a fixed priority thread being next to be processed by a corresponding processor.

15. The computer program product of claim 14, wherein the fixed priority thread at the top of the first local run queue is a fixed priority thread having a highest priority relative to other fixed priority threads identified in the set of local run queues.

16. The computer program product of claim 11, wherein the instructions for identifying an executing thread on one of the plurality of processors include instructions for determining a subset of other local run queues of the plurality of local run queues that are associated with a processor having a running thread of less priority than the fixed priority thread.

17. The computer program product of claim 16, wherein the instructions for displacing the executing thread with the fixed priority thread include instructions for assigning the fixed priority thread to one of the local run queues in the subset of other local run queues.

18. The computer program product of claim 17, wherein the instructions for assigning the fixed priority thread to one of the local run queues in the subset of other local run queues include:

instructions for identifying a lowest priority executing thread that is executing on a processor; and instructions for assigning the fixed priority thread to a local run queue associated with the processor on which the lowest priority executing thread is executing.

19. The computer program product of claim 11, wherein the computer program product is executed at periodic intervals.

20. The computer program product of claim 11, wherein the instructions for identifying a first local run queue and the instructions for identifying an executing thread are executed without obtaining locks on the local run queues.

21. An apparatus for managing fixed priority threads in a multiple processor system having a plurality of processors, the multiple processor system having a plurality of local run queues, each of the plurality of processors being associated with at least one of the plurality of local run queues, the apparatus comprising:

means for dispatching threads to ones of the plurality of local run queues, said plurality of threads including a plurality of fixed priority threads; and means for performing fixed priority load balancing on the plurality of local run queues, the means for performing fixed priority load balancing includes means for identifying a first local run queue from the plurality of local run queues, the first local run queue having a fixed priority thread at the top of the first local run queue, means for identifying an executing thread on one of the plurality of processors, the executing thread having a lower priority than the fixed priority thread, and means for displacing the executing thread with the fixed priority thread.

22. The apparatus of claim 21, wherein the means for identifying a first local run queue includes means for identifying a fixed priority thread on the first local run queue by processing thread attribute information identifying threads as either fixed priority threads or a non-fixed priority threads.

23. The apparatus of claim 22, wherein the means for identifying a first local run queue includes means for examining a flag associated with each local run queue in the plurality of local run queues, without obtaining a lock on the local run queues, the flag identifying whether or not a corresponding local run queue has a fixed priority thread at a top of the corresponding local run queue.

24. The apparatus of claim 21, wherein the means for identifying a first local run queue from the plurality of local run queues includes means for identifying a set of local run queues from the plurality of local run queues, the set of local run queues being local run queues that each have a fixed priority thread being next to be processed by a corresponding processor.

25. The apparatus of claim 24, wherein the fixed priority thread at the top of the first local run queue is a fixed priority thread having a highest priority relative to other fixed priority threads identified in the set of local run queues.

26. The apparatus of claim 21, wherein the means for identifying an executing thread on one of the plurality of processors includes means for determining a subset of other local run queues of the plurality of local run queues that are associated with a processor having a running thread of less priority than the fixed priority thread.

27. The apparatus of claim 26, wherein the means for displacing the executing thread with the fixed priority thread includes means for assigning the fixed priority thread to one of the local run queues in the subset of other local run queues.

28. The apparatus of claim 27, wherein the means for assigning the fixed priority thread to one of the local run queues in the subset of other local run queues includes:

means for identifying a lowest priority executing thread that is executing on a processor; and means for assigning the fixed priority thread to a local run queue associated with the processor on which the lowest priority executing thread is executing.

29. The apparatus of claim 21, wherein the apparatus operates at periodic intervals.

30. The apparatus of claim 21, wherein the means for identifying a first local run queue from the plurality of local run queues and the means for identifying an executing thread on one of the plurality of processors operate without obtaining locks on the local run queues.

* * * * *